Figure 1:
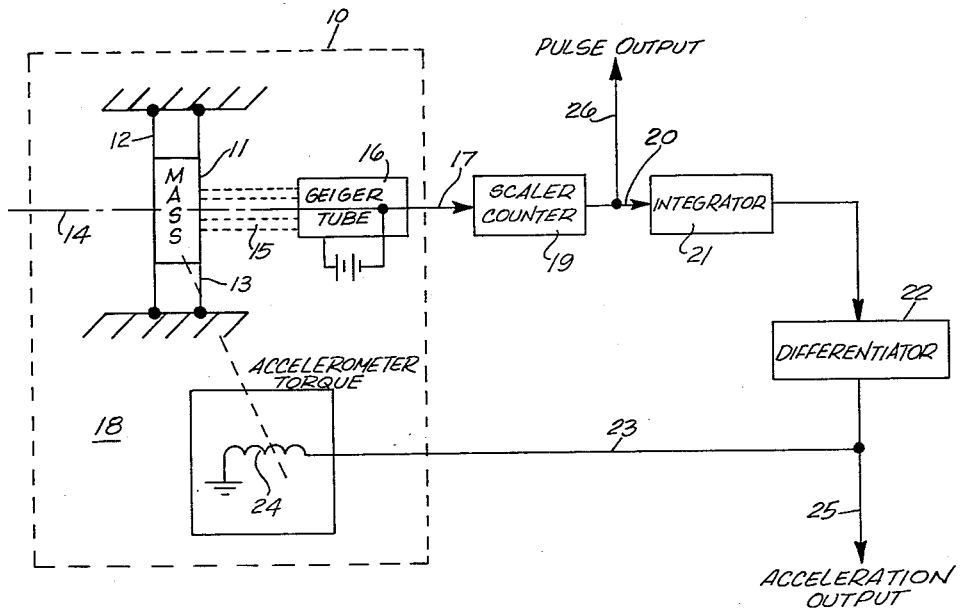

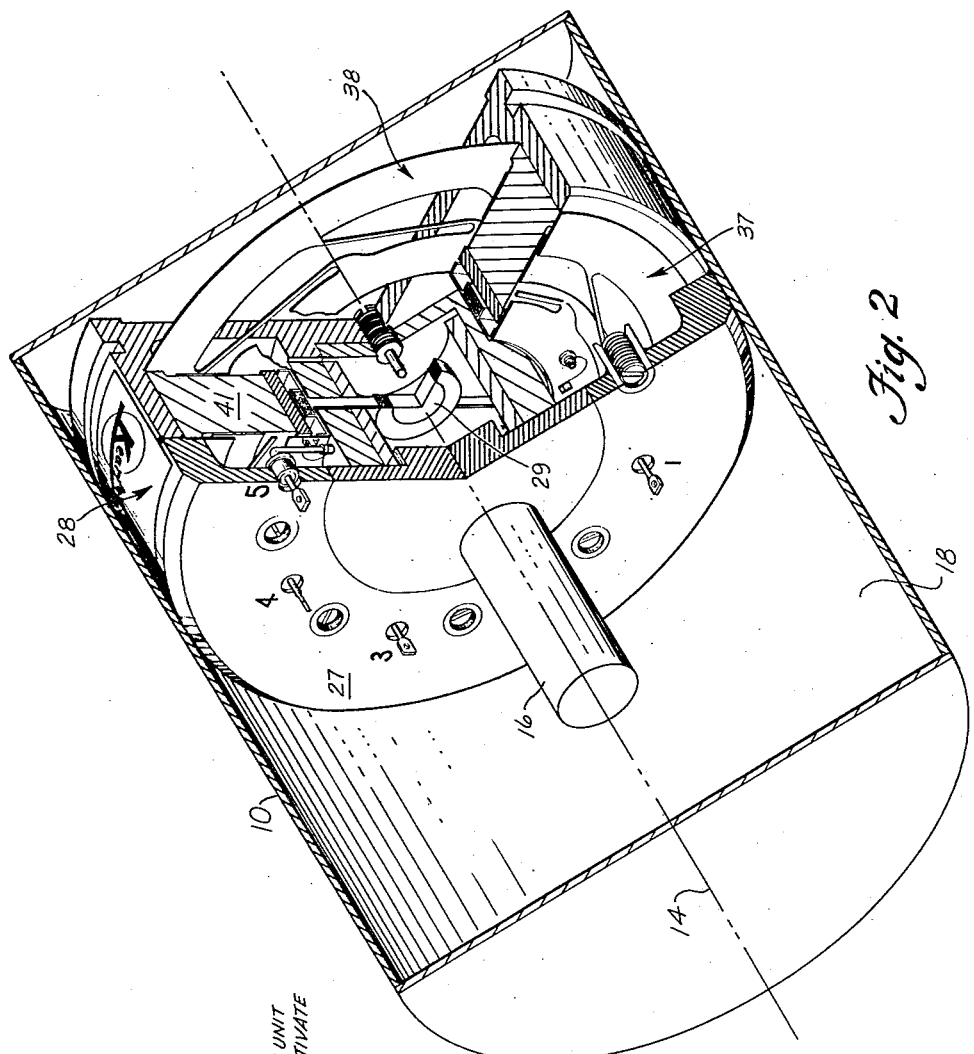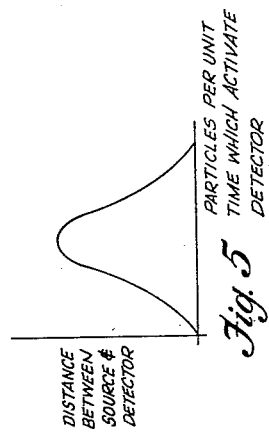

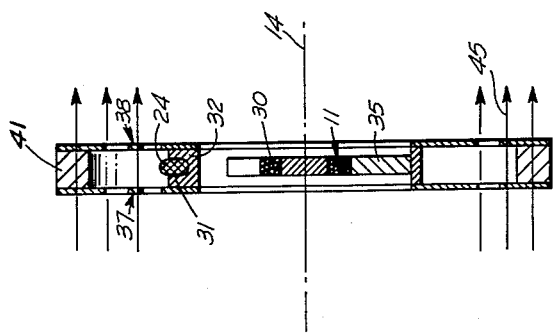
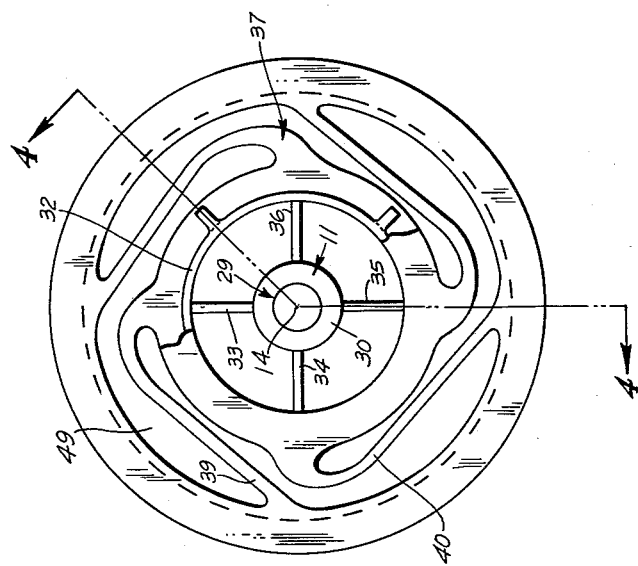
Robert J. Cohen
INVENTOR.
BY
ATTORNEYS

United States Patent Office 3,120,130
Patented Feb. 4, 1964

3,120,130
DIGITAL RADIO ACTIVE PARTICLE DETECTOR
AND CONTROL FOR ACCELEROMETER
Robert J. Cohen, Wyckoff, N.J., assignor to General
Precision Inc., Little Falls, N.J., a corporation of
Delaware
Filed Mar. 29, 1961, Ser. No. 99,187
6 Claims. (Cl. 73—517)

This invention generally relates to accelerometers, and more particularly to accelerometers having a displaceable inertia element responsive to acceleration and employing a digitally operating radioactive detector and servo-system.

This application is related to an application for U.S. Patent, Serial No. 103,549, entitled Light Weight Precision Linear Accelerometer, filed in the U.S. Patent Office on April 17, 1961, by Robert J. Cohen and assigned to the same assignee as the present invention.

In measuring acceleration by determining the movement of a mass or inertia element in response to the accelerational force, a considerable problem exists in detecting very small accelerations because of the difficulty of measuring the very small distances of movement of the mass by the use of conventional transducers of the magnetic, capacitive, or other of the commonly used analog devices. For example, the displacement of the mass in response to small accelerational forces in the order of one ten thousandths of the force of gravity is so extremely small that it is hardly detectable by a conventional magnetic transducer.

Additionally, in many applications of accelerometers, it is desired that the accelerometer produce a digital output signal that may be fed directly into a digital computer or into a digitally-operating control system. For such applications, the analog signal being produced by a conventional magnetic transducer must be converted into a suitable digital pulse form compatible with that of the computer or digital system. Accordingly, there exists a need for a way to determine the displacement of the mass in an accelerometer more accurately and sensitively than can be accomplished with conventional magnetic or like transducers and it is highly desirable that the need be fulfilled so as to produce an acceleration indicating signal in a digital form suitable for use with a digital computer or digital control system.

According to the present invention, there is provided a digitally operating accelerometer wherein the displacement of the mass in response to acceleration forces is detected by transducer means in the form of the number of impulses received during a given time interval, and accordingly the acceleration force is obtained in digital form as is desired. Very generally, this digital transducer is obtained by providing a source for generating radioactive particles, such as alpha particles, together with a detector of such particles, such as a Geiger-Mueller type tube, with one of these devices being immovably affixed within the accelerometer housing and the other being movable with the inertia mass. Statistically speaking, the radioactive source emits a constant number of alpha particles during each interval of time, but the number of emitted particles that succeed in reaching the detector depends on, and is very accurately proportional to, the distance between the source and the detector. Consequently, this radioactive system produces an extremely accurate and sensitive digital indication of the displacement of the inertia element and accordingly provides a measure of the acceleration force.

It is accordingly a principal object of the invention to provide a highly sensitive and accurate accelerometer capable of measuring very small accelerational forces in the order of ten thousandths of the force of gravity.

A further object is to provide such an accelerometer that is capable of rapidly detecting changes in such small forces by digital means.

A still further object is to provide such an accelerometer employing a radioactive transducer and detector means.

A further object is to provide an accelerometer employing an alpha particle generator and a detector for providing extremely sensitive measurement of minute accelerations.

A still further object is to provide a spring suspension system for an accelerometer that is extremely sensitive to small forces, enabling extremely small accelerational forces to be detected.

Other objects and many additional advantages will be more readily understood by those skilled in the art after a detailed consideration of the following specification taken with the accompanying drawings, wherein:

FIGURE 1 is a block diagram for illustrating the functioning of one preferred accelerometer device according to the invention, together with its transducer and servo-restoring apparatus, FIGURE 2 is a perspective view, partially in section, illustrating details of a preferred accelerometer construction, functioning as in the manner of that shown in FIGURE 1, FIGURE 3 is a side elevational view illustrating a preferred proof mass and flat geophysical spring suspension therefor, employed in the accelerometer of FIGURE 2, and FIGURE 4 is a sectional view taken along lines 4—4 of FIGURE 3.

FIGURE 5 represents a distribution curve.

Referring to the drawings for a detailed consideration of one preferred embodiment of the invention, there is functionally shown in FIGURE 1, the elements of one preferred accelerometer mechanism and its transducer and servo structure. As shown, there is provided within a hollow accelerometer housing 10, a proof mass or inertia element 11, suitably supported by a pair of plate springs, represented as 12 and 13, for movement along at least one sensitive axis 14 in response to acceleration forces directed along this sensitive axis. The proof mass 11 is provided with a radio-active particle-emitting material, such as by being coated with a layer of radioactive material that generates radioactive alpha particles or the like, as generally indicated by the lines 15 representing this radiation. Thus as the proof mass 11 is reciprocably displaced along the sensitive axis 14 in a response to outside acceleration forces directed along the sensitive axis, the alpha particle generating material is likewise displaced.

Spaced from the proof mass 11 and confronting the alpha particle radiating material along sensitive axis 14, there is provided an alpha particle detector 16, which may be of the Geiger tube type or other radio-active particle detector of types well known in the art. The Geiger tube 16 is immovably affixed within the accelerometer housing 10 and is disposed to confront the source of radioactive material and receive the alpha particles 15 emanating from the material.

As generally indicated by the distribution curve shown in FIGURE 5, the radioactive material on the proof mass 11 discharges a substantially fixed number of alpha particles during each time interval and these particles are propagated outwardly as is indicated by the radiation lines 15 in FIGURE 1.

The curve shown in FIGURE 5 shows the relation between the distance between the radio-active source and the detector, and the alpha particles per unit of time which activate the detector.

A number of such alpha particles reach the detector tube 16 and are detected by the Geiger tube 16 to produce electrical impulses over line 17 representing the number of alpha particles being detected. The alpha particles are, however, resisted or attenuated by a gas 18 within the accelerometer housing 10 and, therefore, the number of such alpha particles that succeed in reaching the detector tube 16 is a function of both the density and type of the gas 18 within the housing 10, and the distance between the proof mass 11 and the Geiger tube 16.

According to the invention, the accelerometer housing 10 is preferably hermetically sealed and filled with an inert gas, such as nitrogen, that is maintained at constant pressure within the housing 10 for the purpose of minimizing the effect of gas pressure variations within the housing 10. Under these conditions, the number of alpha particles received by the detector tube 16 is proportional only to the distance between the proof mass 11 and the fixed detector tube 16. In this manner, the total alpha particle count produced by the Geiger tube 16 during any given interval of time is proportional to the distance between the proof mass 11 and the Geiger tube 16, and knowing the Geiger count at the central or null position of proof mass 11, the displacement of the proof mass in response to acceleration may readily be detected by the increase or decrease in the alpha particle count.

The electrical pulse output from the Geiger tube is directed over line 17 to a scaler or counter unit 19, which serves the purpose of proportionally reducing the number of electrical impulses, and the output pulses from the scaler or counter 19 are then directed over line 20 to an integrator unit 21 and thence to a differentiator unit 22. The integrator unit 21 serves the purpose of providing a continuous count or summation of the number of pulses from the scaler or counter 19 and this quantity is differentiated by the differentiator unit 22 to determine the rate-of-change in the number of counts or impulses which, in turn, is proportional to the displacement of the proof mass from its central or null position. For example, when the proof mass 11 is at its central position with respect to the Geiger tube 16, the Geiger tube receives a substantially fixed number of counts or impulses during each similar interval of time. On the other hand, when the proof mass 11 is displaced along sensitive axis 14 in a direction toward the Geiger tube 16, the count or impulse rate increases in proportion to the extent of the displacement toward the detector tube 16 whereas, when the proof mass 11 is displaced in the opposite direction and away from the Geiger tube 16, the count or impulse rate proportionally falls by an amount proportional to the amount of the displacement. By first integrating the scaled down pulses obtained from the Geiger tube, there is obtained a quantity proportional to the total number of impulses received during the time interval and by later differentiating this integrated quantity, there is obtained an electrical signal proportional to the change in the number of impulses received during the time interval, which in turn is proportional to the displacement of the proof mass 11 or to the acceleration.

For restoring the proof mass 11 to its null position after each displacement, the differentiated signal obtained from differentiator 22 is then directed backwardly over line 23 to energize a torque winding 24 that imposes a restoring force on the proof mass 11 in such direction as to always return the proof mass 11 to its null or original position. The force being generated by the torque winding 24 is, therefore, proportional to the acceleration force operating upon the proof mass 11 and consequently, the signal on line 23 is directly proportional to the acceleration and may be employed as an analog output signal from the accelerometer when taken from output line 25.

On the other hand, if it is desired to obtain a pulse-type output from the accelerometer, digital output may be taken from line 26 leading from the output of the scaler or counter unit 19 which, as will be recalled, provides a number of discrete impulses that are proportional to the distance between the proof mass 11 and the detector tube 16.

FIGURE 2 illustrates one preferred accelerometer construction functioning in the mode of operation discussed above. As shown, the housing 10 is comprised of a sealed hollow container filled with a suitable inert gas, such as nitrogen 18. Within the container 10 is suitably supported a Geiger-Mueller tube 16 or other type of detecting tube that is rigidly fastened to and supported by an inner housing wall 27. As shown, the inner housing wall part 27 may itself be part of a flat sealed inner housing unit 28 that contains a displaceable mass member 29. The mass member 29 is suitably supported by a pair of flat spider type springs 37, 38, such as geophysical springs, for enabling the mass member 29 to be displaced along the sensitive axis 14, which in the embodiment shown lies along the central axis of the housing 10, Geiger-Mueller tube 16, and inner sealed housing unit 28.

As best shown in FIGURES 3 and 4, the proof mass 11 is preferably formed of a thin flat disc or annular ring 30 that is concentrically supported within an annular frame 32 by means of a series of radial spokes 33, 34, 35 and 36. The annular frame 32 is provided with a central groove channel about its outer periphery, as best shown at 31 in FIGURE 4, for the purpose of supporting a torque coil 24 concentrically wound in the groove channel. Thus, the overall mass member 29 is comprised of the inner mass annular disc 30, having a coating of radioactive material thereon, within an annular frame 32 together with spoke-like elements 33, 34, 35, and 36, which serve to concentrically support the mass disc 30 within the annular frame 32.

The complete mass element is, in turn, supported within the inner housing unit 28 for displacement along sensitive axis 14 by means of a pair of flat spider or geophysical springs 37 and 38 on opposite sides thereof. The spider or geophysical springs 37 and 38 are generally flat disc-shaped members of spring metal that are supported by the housing at their outer peripheries and are provided with a central opening to enable radiation from the central mass circular disc 30 to pass outward from the proof mass 11. Each of the geophysical springs is formed with a plurality of arcuately-shaped cutouts, such as 49 in FIGURE 3, to provide a series of arcuate flexure arms such as 39 and 40 that are adapted to flex along sensitive axis 14 but to resist deflection along any other axis. As described, therefore, the mass member 29, containing the torque coil 24, is sandwiched between geophysical springs 37 and 38 whereby the proof mass 11 may be displaced along the sensitive axis 14, toward and away from the Geiger tube 16, but may not be displaced along any other axis.

The outer peripheries of the flat spider or geophysical springs 37 and 38 are fastened to opposite sides of a large annular permanent magnet member 41 as best shown in FIGURE 2. The annular permanent magnet 41 is formed with its opposite annular faces oppositely magnetized, whereby the magnetic flux represented by arrows 45 in FIGURE 4, is directed longitudinally through the central opening in the permanent magnet and parallel to the sensitive axis 14 of the accelerometer. The torque coil 24 is likewise wound about sensitive axis 14 as its center in the same direction or parallel to the magnetic flux 45 produced by the permanent magnet 41. Consequently, by energizing the torque coil 24 with a current flow in one given direction or polarity, the flux being generated thereby will aid the magnetic flux 45 of the permanent magnet 41 and by energizing the coil 24 with an opposite polarity signal, the torque coil flux will oppose that of the permanent magnet 41. Thus, by suitably energizing the torque coil 24, the proof mass 11 and coil structure may be reciprocably positioned along sensitive axis 14 by means of interaction of the flux of the torque coil 24 with the magnetic flux 45 produced by permanent magnet 41, thereby to continually restore the proof mass to its central or null position after each displacement of the proof mass.

Although but one preferred embodiment of the invention has been illustrated and described, it will be apparent to those skilled in the art that many changes may be made in the preferred accelerometer as illustrated and described without departing from the spirit and scope of this invention. Accordingly, this invention is to be considered as being limited only by the following claims appended thereto.

What is claimed is:

1. In an accelerometer for detecting small inertia forces, a support, a proof mass and spring suspension means therefor for suspending said proof mass within said support for freedom of movement along at least one sensitive axis, and radioactive means for detecting the extent of displacement between said proof mass and the support, said radioactive means including a radioactive alpha particle generator means and an alpha particle detector means, one of said means being affixed to said support and the other of said means being movable with said proof mass, and an integrating means for summing the number of alpha particles received by said alpha particle detector means, during a specific time interval, and a differentiator means energized by the integrating means for determining the rate of change in the number of alpha particles detected, during a specific time interval.

2. A digital accelerometer comprising a sealed housing containing an inert gas, a proof mass means supported within the housing by means of relatively flat springs for displacement along at least one sensitive axis, said proof mass means having means incorporated therewith for producing radioactive alpha particles, an alpha particle detector means affixed within said housing and spaced from said proof mass means to detect alpha particles being generated by said material incorporated with the proof mass means, whereby the number of alpha particles received by said alpha particle detector during any given time interval is proportional to the distance between said proof mass and said alpha particle detector, said proof mass means comprising a mass element having a thin coating of alpha particle emitting material thereon and an integrating means for summing the number of alpha particles received by said alpha particle detector means, during a specific time interval, and a differentiator means energized by the integrating means for determining the rate of change in the number of alpha particles detected, during a specific time interval.

3. A radioactive transducer for determining the extent of deviation between two members, one of said members being axially movable relative to the other, from a given spacing therebetween, comprising an alpha particle generating means supported by the movable one of said members and an alpha particle detector supported by the relatively fixed member of said members, and disposed in receptive relationship to said alpha particle generating means, scaler means energized by said alpha particle detector to proportionally reduce the count rate of the one condition relative to the other condition of the detector, an inegrator energized by said scaler means, and a differentiator energized by said integrator and producing a signal proportional to the rate of change of the integrator, whereby said differentiator signal is proportional to the deviation of the movable of said members from said given spacing therebetween, a hermetically sealed housing enclosing said radioactive transducer and containing a neutral gas therein at relatively constant pressure and density.

4. A servo system for maintaining two relatively movable members with a given spacing therebetween, comprising a generator means for producing radioactive radiation supported on one of the relatively movable members, radioactive detector means supported on the other relatively movable member and positioned to detect radiation from the radioactive generator means, means responsive to the radioactive detector means for producing a signal proportional to the rate of change of the radiation received by the radioactive detector means from a given level of radiation, and torque exerting means controlling one of said relatively movable members and being energized by said signal for displacing one of said members relative to the other to continually maintain the given spacing therebetween, said generator means producing alpha particle radiation, and such signal producing means including an integrator for accumulating impulses proportional to the number of particles detected by said radioactive detector means, and a differentiator energized by said integrator for producing said signal.

5. An accelerometer comprising: a housing, a flat mass element within the housing and having a coating of radioactive alpha particle producing material, multiple flat flexible spring means supporting said mass element for displacement along a sensitive axis, and an alpha particle detector spaced from said radioactive coating material on said mass element, means energized by said alpha particle detector for producing a signal proportional to the change in displacement of said mass element from said alpha particle detector along said sensitive axis, and torque means energized by said signal for restoring said mass element to a given position upon a displacement thereof, said torque means including a permanent magnet supported within said housing and providing a flux along said sensitive axis, and a torque coil supported by said mass element and in force engaging relationship with said permanent magnet flux, said torque coil being energizable by said signal to axially displace said mass element, said housing being hermetically sealed and containing a neutral gas at relatively constant pressure and density, said means energized by said alpha particle detector including an integrator for producing a continuously increasing quantity proportional to the integral of the number of alpha particles detected, and a differentiator for producing said signal proportional to the rate of change of said integrated quantity.

6. An accelerometer comprising a housing, a flat mass element within the housing and having a coating of radioactive alpha particle producing material, multiple flat flexible spring means supporting said mass element for displacement along a sensitive axis, and an alpha particle detector spaced from said radioactive coating material on said mass element, means energized by said alpha particle detector for producing a signal proportional to the change in displacement of said mass element from said alpha particle detector along said sensitive axis, and torque means energized by said signal for restoring said mass element to a given position upon a displacement thereof, said torque means including a permanent magnet supported within said housing and providing a flux along said sensitive axis, and a torque coil supported by said mass element and in force engaging relationship with said permanent magnet flux, said torque coil being energizable by said signal to axially displace said mass element, said means energized by said alpha particle detector including an integrator for producing a continuously increasing quantity proportional to the integral of the number of alpha particles detected, and a differentiator for producing said signal proportional to the rate of change of said integrated quantity, and feedback means for interconnecting said differentiator and the torque coil.

References Cited in the file of this patent

UNITED STATES PATENTS

| | | |
|---|---|---|
| 2,502,132 | Efromson | Mar. 28, 1950 |
| 2,506,585 | Elliott | May 9, 1950 |
| 2,725,486 | Walstrom | Nov. 29, 1955 |
| 2,767,973 | Ter Veen | Oct. 23, 1956 |
| 2,780,101 | Kinkel | Feb. 5, 1957 |
| 2,800,591 | Gilman | July 23, 1957 |
| 2,853,287 | Draper | Sept. 23, 1958 |
| 2,913,900 | Andrews | Nov. 24, 1959 |
| 3,024,364 | Wanetick | Mar. 6, 1962 |